(12) United States Patent
Bruck et al.

(10) Patent No.: US 10,712,513 B2
(45) Date of Patent: *Jul. 14, 2020

(54) METHOD AND SYSTEM FOR TWO-DIMENSIONAL MODE-MATCHING GRATING COUPLERS

(71) Applicant: Luxtera, LLC., Wilmington, DE (US)

(72) Inventors: Roman Bruck, Carlsbad, CA (US); Attila Mekis, Carlsbad, CA (US)

(73) Assignee: Luxtera, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/594,498

(22) Filed: Oct. 7, 2019

(65) Prior Publication Data

US 2020/0057211 A1 Feb. 20, 2020

Related U.S. Application Data

(63) Continuation of application No. 15/957,000, filed on Apr. 19, 2018, now Pat. No. 10,436,990.
(Continued)

(51) Int. Cl.
*G02B 6/42* (2006.01)
*G02B 6/43* (2006.01)
(Continued)

(52) U.S. Cl.
CPC ........... *G02B 6/4206* (2013.01); *G02B 6/122* (2013.01); *G02B 6/124* (2013.01);
(Continued)

(58) Field of Classification Search
CPC combination set(s) only.
See application file for complete search history.

(56) References Cited

U.S. PATENT DOCUMENTS 6,393,183 B1 * 5/2002 Worley ................. G02B 6/122
257/81
6,788,847 B2 9/2004 Paddon
(Continued)

OTHER PUBLICATIONS

Notification of Transmittal of the International Search Report and the Written Opinion of the International Searching Authority, or the Declaration, dated Aug. 1, 2018; For Internatonal Application No. PCT/US18/28426; International Filing Date Apr. 19, 2018.

*Primary Examiner* — Omar S Ismail
(74) *Attorney, Agent, or Firm* — Patterson + Sheridan, LLP

(57) ABSTRACT

Methods and systems for two-dimensional mode-matching grating couplers may include in a photonic chip comprising a grating coupler at a surface of the photonic chip, where the grating coupler has increased scattering strength in a direction of a light wave traveling through the grating coupler: receiving an optical signal from a first direction within the photonic chip; and scattering the optical signal out of the surface of the photonic chip. A second optical signal may be received in the grating coupler from a second direction within the photonic chip. The second optical signal may be scattered out of the surface of the photonic chip. The increasing scattering strength may be caused by increased width scatterers along a direction perpendicular to the direction of light travel. The increased scattering strength may be caused by a transition of shapes of scatterers in the grating coupler.

14 Claims, 8 Drawing Sheets

Related U.S. Application Data

(60) Provisional application No. 62/606,140, filed on Apr. 19, 2017.

(51) Int. Cl.
| | |
|---|---|
| *H04B 10/25* | (2013.01) |
| *H04B 10/70* | (2013.01) |
| *H04B 10/66* | (2013.01) |
| *G02B 6/12* | (2006.01) |
| *G02B 6/122* | (2006.01) |
| *G02B 6/124* | (2006.01) |
| *G02B 6/125* | (2006.01) |
| *G02B 6/136* | (2006.01) |
| *G02B 6/30* | (2006.01) |

(52) U.S. Cl.
CPC ......... *G02B 6/12004* (2013.01); *G02B 6/125* (2013.01); *G02B 6/136* (2013.01); *G02B 6/30* (2013.01); *G02B 6/43* (2013.01); *H04B 10/2504* (2013.01); *H04B 10/66* (2013.01); *H04B 10/70* (2013.01); *G02B 2006/12107* (2013.01); *G02B 2006/12147* (2013.01)

(56) References Cited

U.S. PATENT DOCUMENTS

| | | | |
|---|---|---|---|
| 8,213,751 B1 * | 7/2012 | Ho | G02B 6/43 |
| | | | 385/1 |
| 8,619,363 B1 * | 12/2013 | Coleman | G02B 5/0242 |
| | | | 359/576 |
| 2004/0129949 A1 * | 7/2004 | Deliwala | B82Y 20/00 |
| | | | 257/194 |
| 2004/0156589 A1 * | 8/2004 | Gunn, III | G02B 6/12004 |
| | | | 385/37 |
| 2007/0154144 A1 * | 7/2007 | Greiner | G02B 5/203 |
| | | | 385/37 |
| 2007/0263973 A1 * | 11/2007 | Van Laere | G02B 6/124 |
| | | | 385/129 |
| 2008/0197362 A1 * | 8/2008 | Hisamoto | G02B 6/13 |
| | | | 257/86 |
| 2010/0172613 A1 * | 7/2010 | Hayakawa | G02B 6/43 |
| | | | 385/18 |
| 2014/0010498 A1 * | 1/2014 | Verslegers | G02B 6/124 |
| | | | 385/37 |
| 2014/0193115 A1 * | 7/2014 | Popovic | G02B 6/124 |
| | | | 385/14 |
| 2014/0363127 A1 | 12/2014 | Baets et al. | |
| 2015/0215046 A1 | 7/2015 | Mekis et al. | |
| 2015/0260913 A1 * | 9/2015 | Li | H01S 5/10 |
| | | | 385/14 |
| 2017/0269297 A1 * | 9/2017 | Popovic | G02B 6/124 |

* cited by examiner

METHOD AND SYSTEM FOR TWO-DIMENSIONAL MODE-MATCHING GRATING COUPLERS

CROSS-REFERENCE TO RELATED APPLICATIONS/INCORPORATION BY REFERENCE

This application is a continuation of U.S. application Ser. No. 15/957,000 filed on Apr. 19, 2018, now U.S. Pat. No. 10,436,990, which claims priority to and the benefit of U.S. Provisional Application 62/606,140 filed on Apr. 19, 2017, each of which is hereby incorporated herein by reference in its entirety.

FIELD

Aspects of the present disclosure relate to electronic components. More specifically, certain implementations of the present disclosure relate to methods and systems for two-dimensional mode-matching grating couplers.

BACKGROUND

Conventional approaches for optical grating couplers may be costly, cumbersome, and/or inefficient—e.g., they may be complex and/or time consuming, and/or may introduce asymmetry.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

System and methods are provided for two-dimensional mode-matching grating couplers, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry or a device is "operable" to perform a function whenever the circuitry or device comprises the necessary hardware and code (if any is necessary) to perform the function, regardless of whether performance of the function is disabled or not enabled (e.g., by a user-configurable setting, factory trim, etc.).

Figure 1A:
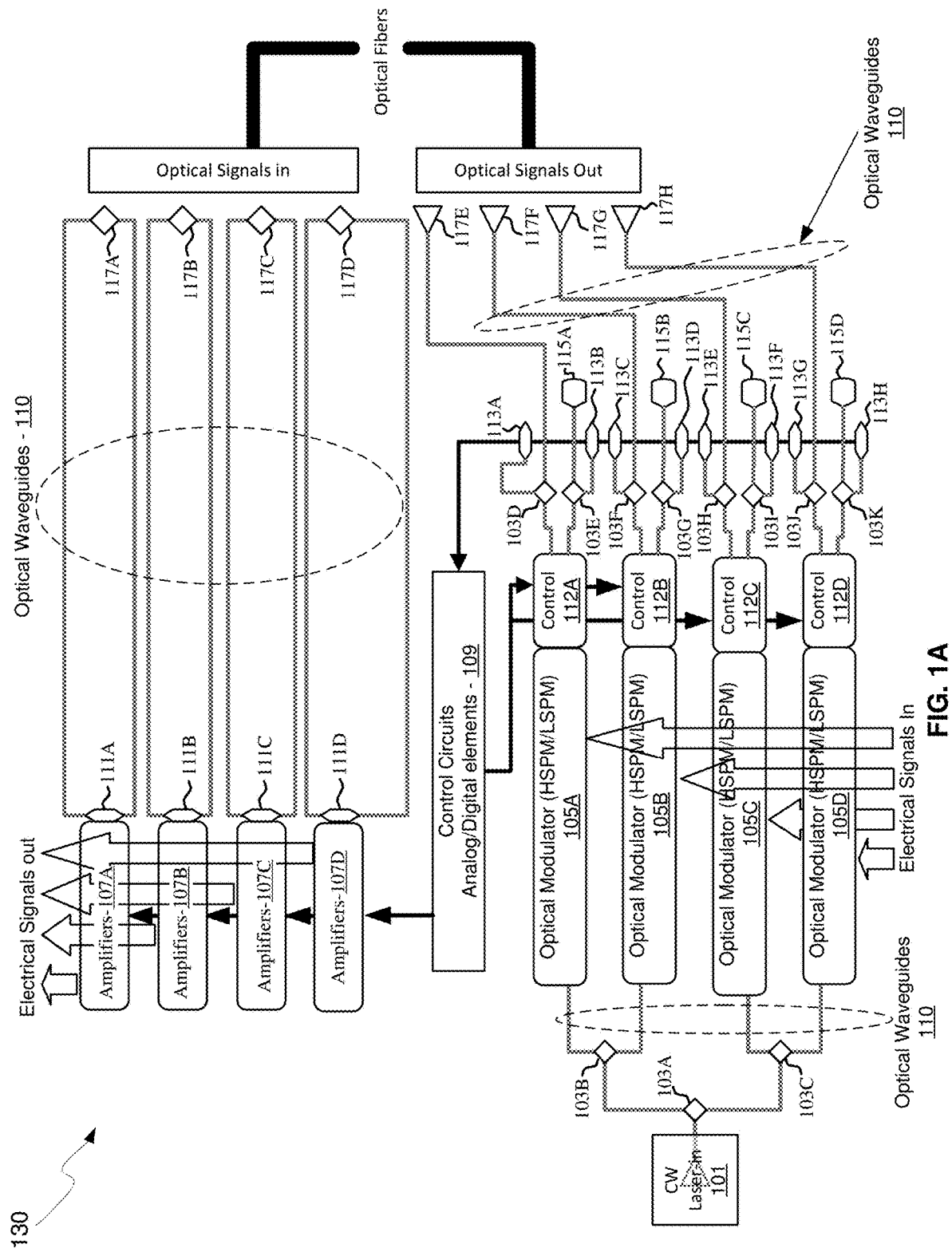
FIG. 1A is a block diagram of a photonically-enabled integrated circuit with two-dimensional mode-matching grating couplers, in accordance with an example embodiment of the disclosure.

FIG. 1A is a block diagram of a photonically-enabled integrated circuit with mode converters for grating couplers, in accordance with an example embodiment of the disclosure. Referring to FIG. 1A, there is shown optoelectronic devices on a photonically-enabled integrated circuit 130 comprising optical modulators 105A-105D, photodiodes 111A-111D, monitor photodiodes 113A-113H, and optical devices comprising couplers 103A-103K, optical terminations 115A-115D, grating couplers 117A-117H with mode matching. There are also shown electrical devices and circuits comprising amplifiers 107A-107D, analog and digital control circuits 109, and control sections 112A-112D. The amplifiers 107A-107D may comprise transimpedance and limiting amplifiers (TIA/LAs), for example.

In an example scenario, the photonically-enabled integrated circuit 130 comprises a complementary metal oxide semiconductor (CMOS) photonics die with a laser assembly 101 coupled to the top surface of the IC 130. The laser assembly 101 may comprise one or more semiconductor lasers with isolators, lenses, and/or rotators for directing one or more CW optical signals to the coupler 103A. The photonically enabled integrated circuit 130 may comprise a single chip, or may be integrated on a plurality of die, such as one or more electronics die and one or more photonics die.

Optical signals are communicated between optical and optoelectronic devices via optical waveguides 110 fabricated in the photonically-enabled integrated circuit 130. Single-mode or multi-mode waveguides may be used in photonic integrated circuits. Single-mode operation enables direct connection to optical signal processing and networking elements. The term "single-mode" may be used for waveguides that support a single mode for each of the two polarizations, transverse-electric (TE) and transverse-magnetic (TM), or for waveguides that are truly single mode and only support one mode whose polarization is TE, which comprises an electric field parallel to the substrate supporting the waveguides. Two typical waveguide cross-sections that are utilized comprise strip waveguides and rib waveguides. Strip waveguides typically comprise a rectangular cross-section, whereas rib waveguides comprise a rib section on top of a waveguide slab. Of course, other waveguide cross section types are also contemplated and are within the scope of the disclosure.

In an example scenario, the couplers 103A-103C may comprise low-loss Y-junction power splitters where coupler 103A receives an optical signal from the laser assembly 101 and splits the signal to two branches that direct the optical signals to the couplers 103B and 103C, which split the optical signal once more, resulting in four roughly equal power optical signals.

The optical modulators 105A-105D comprise Mach-Zehnder or ring modulators, for example, and enable the modulation of the continuous-wave (CW) laser input signal. The optical modulators 105A-105D may comprise high-speed and low-speed phase modulation sections and are controlled by the control sections 112A-112D. The high-speed phase modulation section of the optical modulators 105A-105D may modulate a CW light source signal with a data signal. The low-speed phase modulation section of the optical modulators 105A-105D may compensate for slowly varying phase factors such as those induced by mismatch between the waveguides, waveguide temperature, or waveguide stress. Compensating for these slowly varying phase factors is referred to as the passive phase, or the passive biasing of the Mach-Zehnder Modulator (MZM).

The outputs of the optical modulators 105A-105D may be optically coupled via the waveguides 110 to the grating couplers 117E-117H. The couplers 103D-103K may comprise four-port optical couplers, for example, and may be utilized to sample or split the optical signals generated by the optical modulators 105A-105D, with the sampled signals being measured by the monitor photodiodes 113A-113H. The unused branches of the directional couplers 103D-103K may be terminated by optical terminations 115A-115D to avoid back reflections of unwanted signals.

The grating couplers 117A-117H comprise optical gratings that enable coupling of light into and out of the photonically-enabled integrated circuit 130. The grating couplers 117A-117D may be utilized to couple light received from optical fibers into the photonically-enabled integrated circuit 130, and the grating couplers 117E-117H may be utilized to couple light from the photonically-enabled integrated circuit 130 into optical fibers. The grating couplers 117A-117H may comprise single polarization grating couplers (SPGC) and/or polarization splitting grating couplers (PSGC). In instances where a PSGC is utilized, two input, or output, waveguides may be utilized.

Grating couplers are devices in integrated optical circuits that interface light between telecommunication fibers and optical circuits. They comprise surface emitting elements that diffract guided light out of the plane of the circuit, where it can be collected with standard optical fibers. In contrast to other coupling methods, such as end-face coupling, grating couplers lend themselves to planar fabrication methods and allow free placement of optical interfaces on the chip surface.

Additionally, two-dimensional (2D) gratings allow important multiplexing and de-multiplexing operations, that is, the combination of signals from different optical channels into one channel or the separation of multiple signals in the same channel into individual output channels, respectively. Two-dimensional gratings allow multiplexing in the polarization, wavelength, and spatial domain. For instance, 2D gratings may combine light of two wavelengths from the chip 130 into a single outgoing fiber.

Typically, grating couplers are fabricated by etching the shape of diffractive elements into the waveguide, thus removing material from the waveguide. For one-dimensional (1D) gratings, the diffractive shapes can be as simple as an arrangement of equally-spaced lines, while for two-dimensional gratings, curved lines may be utilized.

Figure 1B:
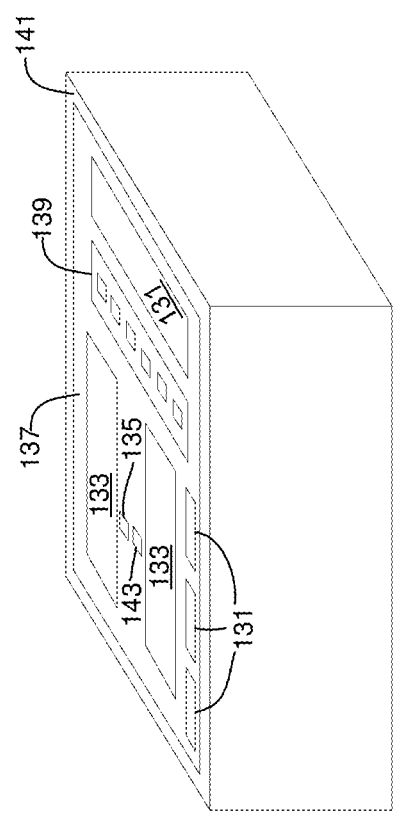
FIG. 1B is a diagram illustrating an exemplary photonically-enabled integrated circuit, in accordance with an example embodiment of the disclosure.

In another exemplary embodiment illustrated in FIG. 1B, optical signals may be communicated directly into the surface of the photonically-enabled integrated circuit 130 without optical fibers by directing a light source on an optical coupling device in the chip, such as the light source interface 135 and/or the optical fiber interface 139. This may be accomplished with directed laser sources and/or optical sources on another chip flip-chip bonded to the photonically-enabled integrated circuit 130.

The photodiodes 111A-111D in FIG. 1A may convert optical signals received from the grating couplers 117A-117D into electrical signals that are communicated to the amplifiers 107A-107D for processing. In an example embodiment of the disclosure, the photodiodes 111A-111D may comprise high-speed heterojunction phototransistors, for example, and may comprise germanium (Ge) in the collector and base regions for absorption in the 1.3-1.6 μm optical wavelength range, and may be integrated on a CMOS silicon-on-insulator (SOI) wafer.

In another example embodiment, the four transceivers shown in FIG. 1A may be incorporated in two or more chips, as opposed to the single chip shown. For example, the electronics devices, such as the control circuits 109 and the amplifiers/TIAs 107A-107D, may be fabricated in an electronics CMOS die while the optical and optoelectronic devices, such as the photodetectors 111A-111D, grating couplers 117A-117H, and the optical modulators 105A-105D may be incorporated on a photonics die, such as a silicon photonics interposer.

The analog and digital control circuits 109 may control gain levels or other parameters in the operation of the amplifiers 107A-107D, which may then communicate electrical signals off the photonically-enabled integrated circuit 130. The control sections 112A-112D comprise electronic circuitry that enable modulation of the CW laser signal received from the splitters 103A-103C. The optical modulators 105A-105D may require high-speed electrical signals to modulate the refractive index in respective branches of a MZM, for example.

In operation, the photonically-enabled integrated circuit 130 may be operable to transmit and/or receive and process optical signals. Optical signals may be received from optical fibers by the grating couplers 117A-117D and converted to electrical signals by the photodetectors 111A-111D. The electrical signals may be amplified by transimpedance amplifiers in the amplifiers 107A-107D, for example, and subsequently communicated to other electronic circuitry, not shown, in the photonically-enabled integrated circuit 130. The grating couplers 117A-117D may comprise two-dimensionally mode matching grating couplers, where the diffractive elements are tuned in each direction of light travel in the couplers, as shown further with respect to FIGS. 2-5.

Electrical signals, labeled as Electrical Signals In in FIG. 1A, may drive the modulators 105A-105D to modulate the CW optical signals received from the CW laser In 101, resulting in modulated optical signals to be communicated in or out of the chip by the grating couplers 117A-117H

FIG. 1B is a diagram illustrating an exemplary photonically-enabled integrated circuit, in accordance with an example embodiment of the disclosure. Referring to FIG. 1B, there is shown the photonically-enabled integrated circuit 130 comprising electronic devices/circuits 131, optical and optoelectronic devices 133, a light source interface 135, a chip front surface 137, an optical fiber interface 139, CMOS guard ring 141, and a surface-illuminated monitor photodiode 143.

The light source interface 135 and the optical fiber interface 139 comprise grating couplers, for example, that enable coupling of light signals via the CMOS chip surface 137. Coupling light signals via the chip surface 137 enables the use of the CMOS guard ring 141 which protects the chip mechanically and prevents the entry of contaminants via the chip edge.

The electronic devices/circuits 131 comprise circuitry such as the amplifiers 107A-107D and the analog and digital control circuits 109 described with respect to FIG. 1A, for example. The optical and optoelectronic devices 133 comprise devices such as the couplers 103A-103K, optical terminations 115A-115D, grating couplers 117A-117H, optical modulators 105A-105D, high-speed heterojunction photodiodes 111A-111D, and monitor photodiodes 113A-113I.

Figure 1C:
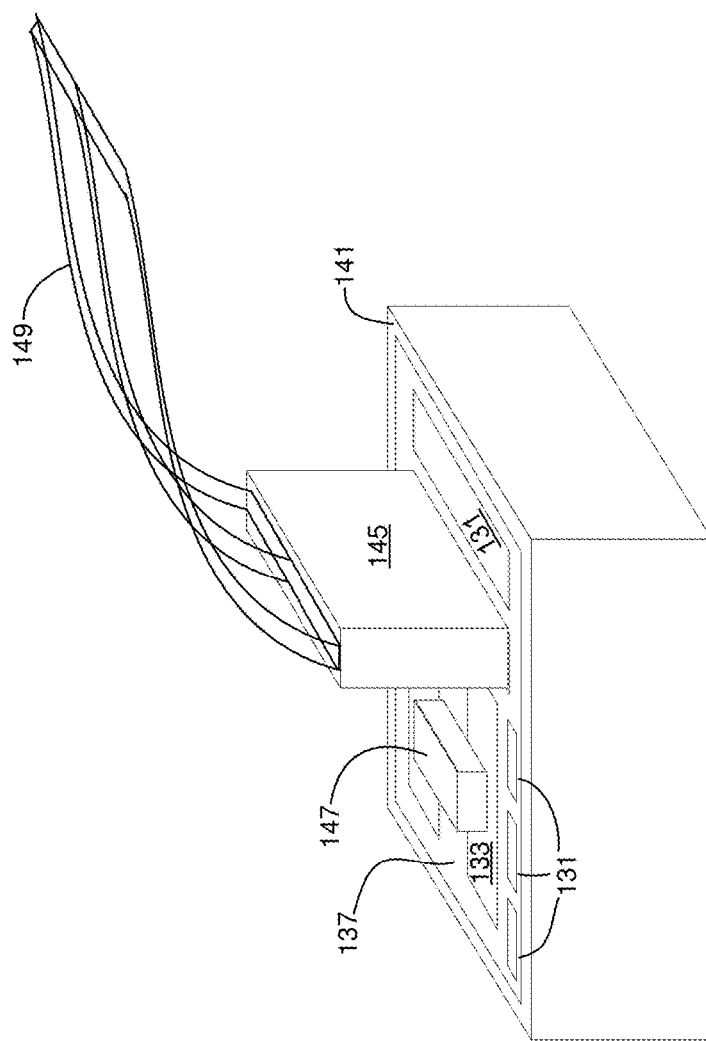
FIG. 1C is a diagram illustrating a photonically-enabled integrated circuit coupled to an optical fiber cable, in accordance with an example embodiment of the disclosure.

FIG. 1C is a diagram illustrating a photonically-enabled integrated circuit coupled to an optical fiber cable, in accordance with an example embodiment of the disclosure. Referring to FIG. 1C, there is shown the photonically-enabled integrated circuit 130 comprising the chip surface 137, and the CMOS guard ring 141. There is also shown a fiber-to-chip coupler 145, an optical fiber cable 149, and an optical source assembly 147.

The photonically-enabled integrated circuit 130 comprises the electronic devices/circuits 131, the optical and optoelectronic devices 133, the light source interface 135, the chip surface 137, and the CMOS guard ring 141 may be as described with respect to FIG. 1B, for example.

In an example embodiment, the optical fiber cable may be affixed, via epoxy for example, to the CMOS chip surface 137. The fiber chip coupler 145 enables the physical coupling of the optical fiber cable 149 to the photonically-enabled integrated circuit 130. In another example scenario, the IC 130 may comprise photonic devices on one die, such as a photonics interposer, and electrical devices on an electronics die, both of which may comprise CMOS die.

Figure 2:
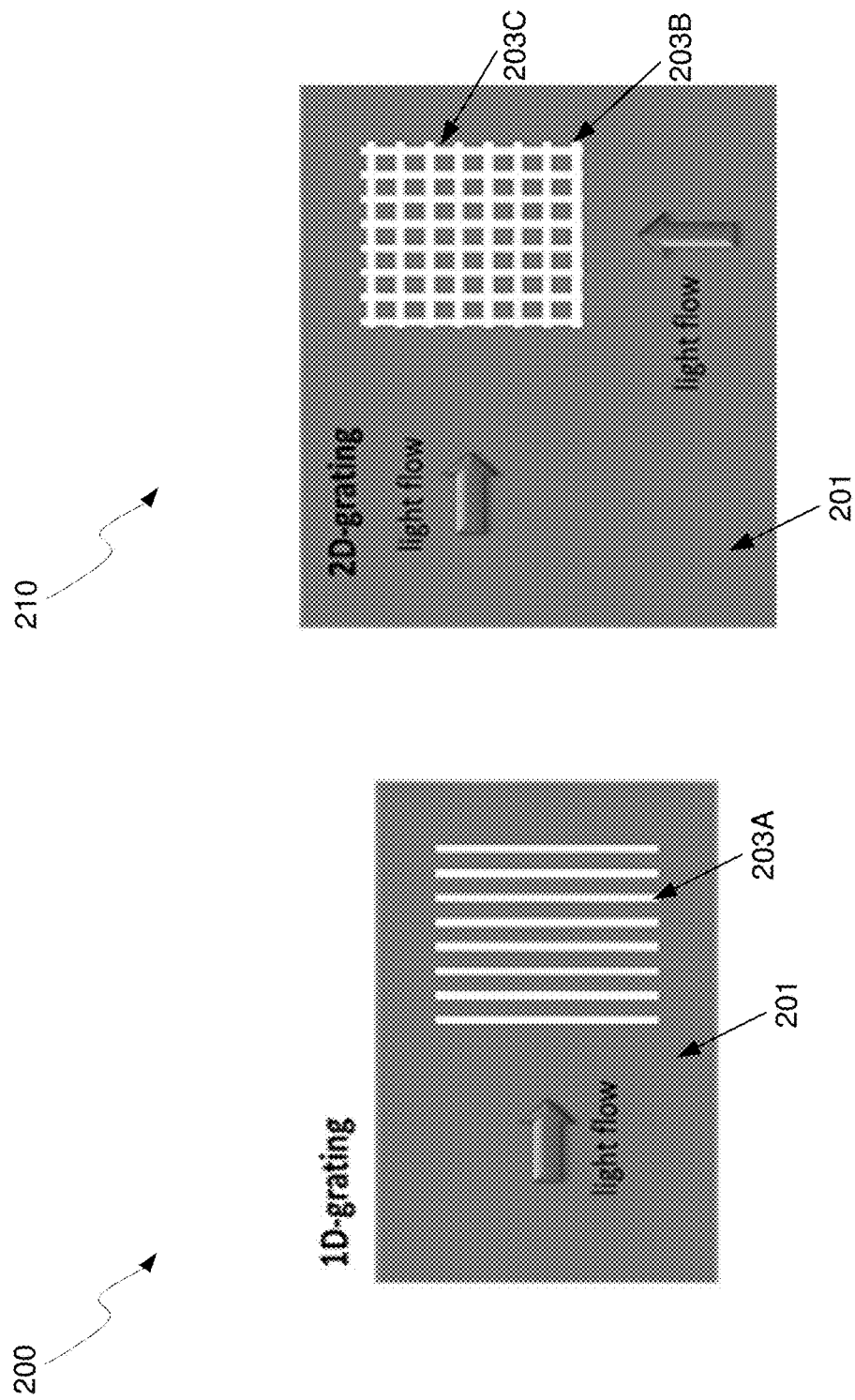
FIG. 2 is a schematic illustrating top views of one- and two-dimensional grating couplers, in accordance with an example embodiment of the disclosure.

FIG. 2 is a schematic illustrating top views of one- and two-dimensional grating couplers, in accordance with an example embodiment of the disclosure. Referring to FIG. 2, there is shown a one-dimensional grating coupler 200 and a two-dimensional grating coupler 210. In an example embodiment, the darker regions of FIG. 2 comprise silicon layer 201 while the white portions of FIG. 2 comprise dielectric gratings 203A-203C, typically comprising silicon dioxide that may be deposited following the removal of some of the silicon 201, although other semiconductor and dielectric materials may be utilized.

To define the direction of the outgoing light, the arrangement of the diffractive elements, the grating lines 203A-203C in FIG. 2, generally need to match the propagation of the guided wave and the outgoing wave. For one-dimensional gratings, an arrangement of lines is sufficient, as indicated by oxide lines 203A, while two-dimensional gratings are often constructed by imposing two 1D gratings in different directions on each other, as illustrated by grating lines 203B and 203C.

For efficient systems, minimizing loss is an important goal of grating coupler design. Loss in such devices mainly stems from two independent mechanisms: 1) losses to the substrate due to the imperfect directivity of the coupler and 2) mode-mismatch loss due to imperfect overlap between the fiber mode and the light profile produced by the grating. Substrate loss may be influenced by grating geometry parameters, such as waveguide thickness and etch depth. The minimization of mode-mismatch may be accomplished through careful design of the diffractive elements along the propagation direction of the light.

To minimize coupling loss, the profile of the out-coupled light needs to be matched to the mode profile of the fiber used for light collection. In one-dimensional gratings, the design process for the diffractive elements is comparatively straightforward and supported by theoretical models. The scattering strength of the diffractive elements, that is the amount of light coupled out of the waveguide per micrometer, may be configured to increase as the light propagates in the grating.

Figure 3:
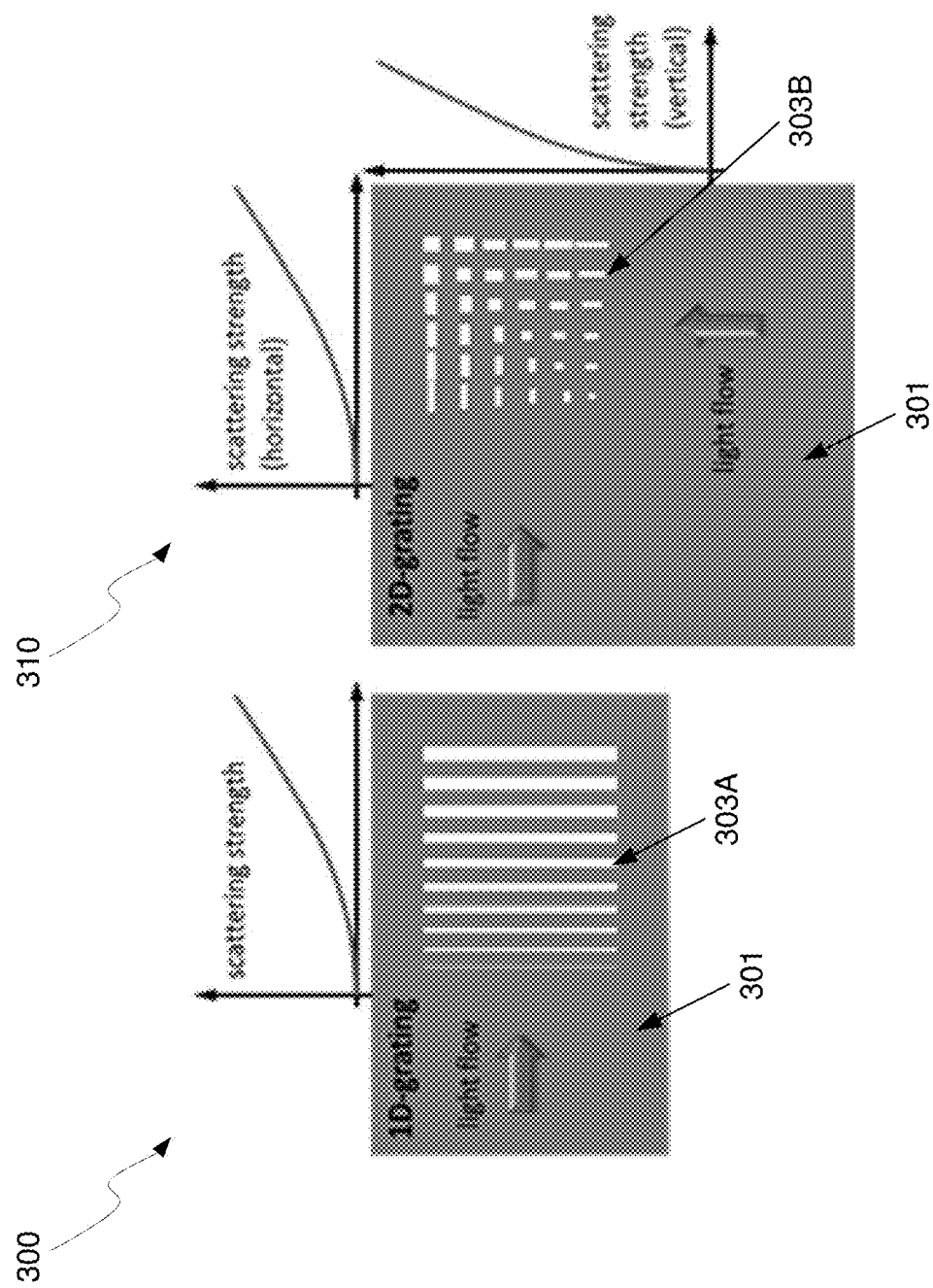
FIG. 3 illustrates one- and two-dimensional grating couplers with mode matching, in accordance with an example embodiment of the disclosure.

FIG. 3 illustrates one- and two-dimensional grating couplers with mode matching, in accordance with an example embodiment of the disclosure. Referring to FIG. 3, there is shown a one-dimensional grating coupler 300 and two-dimensional grating coupler 310, both with mode matching.

The grating coupler 300 shows that with one-dimensional gratings 303A, mode matching can be achieved by increasing the widths of the lines in the direction of the light flow. Following the theoretical prediction for the required scattering strength, as shown by the scattering strength inset adjacent to the grating coupler 300, increasing the width of the diffractive gratings 303A yields an optimum coupling efficiency. As with FIG. 2, the darker regions of FIG. 3 comprise silicon layer 301 while the white portions of FIG. 3 comprise dielectric gratings 303A and 303B, typically comprising silicon dioxide that may be deposited following the removal of some of the silicon 301, although other semiconductor and dielectric materials may be utilized.

In two-dimensional gratings, light is travelling in different directions simultaneously in the grating. This often poses conflicting constraints on the design of the diffractive elements that project different scattering strengths in different directions at the same time, depending on their position in the grating. In this respect, two-dimensional gratings are not overlaps of two one-dimensional gratings. To achieve mode-matching in two-dimensional gratings, and thus achieve minimum loss, each of the two light flows in the photonic circuit needs to experience at each point the correct scattering strength in its direction. In fact, each individual diffractive element has unique characteristics depending on its position in the two-dimensional grating.

Two-dimensional mode-matching gratings vary the scattering strength of their diffractive elements along the individual propagation directions of the light for improved mode overlap with the collecting optical fiber. Key design parameters for such gratings are (i) diffractive elements that project two different scattering strengths in the two directions involved, and (ii) exhibit the correct transition of their shapes over the area of the grating. By properly adjusting these parameters, gratings built from diffractive shapes that observe mode matching in two directions simultaneously can be developed, thus minimizing loss.

In the two-dimensional grating coupler 310, the gratings 303B are different across the area of the coupler 301, in both directions. For example, for light flow in the vertical direction, the gratings range from a narrow width to a wider width in the direction of light travel. Similarly, for light arriving in the horizontal direction to the coupler 310, the gratings 303B range from narrow to wider widths in the direction of light flow.

Therefore, as shown in the insets for the one-dimensional grating 300 and two-dimensional grating 310, the scattering strength increases as each optical mode travels along the direction of travel. Therefore, in the upper right corner of the two-dimensional grating 310, where the optical modes have traveled the farthest from the inputs, the highest scattering strength in both directions is obtained.

Figure 4:
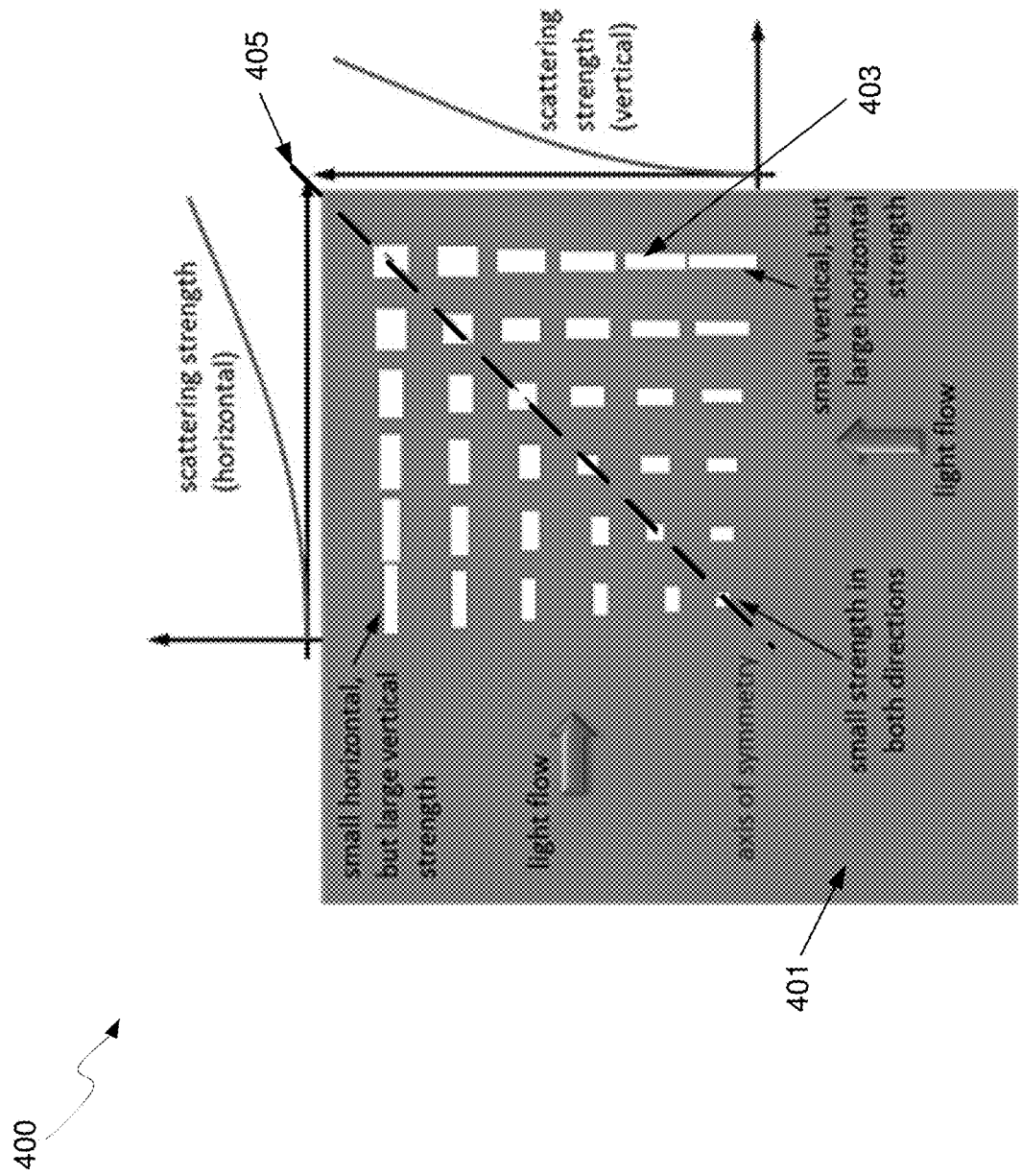
FIG. 4 illustrates a two-dimensional mode-matching grating, in accordance with an example embodiment of the disclosure.

FIG. 4 illustrates a two-dimensional mode-matching grating, in accordance with an example embodiment of the disclosure. Referring to FIG. 4, there is shown two-dimensional grating coupler 400 illustrating the configuration of scattering strength along the two axes of optical wave travel.

FIG. 4 shows a detailed top view of a two-dimensional mode-matching grating coupler 400 with gratings 403 formed in silicon layer 401 and outlines characteristics to be followed in the design process. Along the 45-degree axis of symmetry 405 shown by the dashed line, diffractive elements scatter symmetrically in both directions. While FIG. 4 depicts square-shaped elements along this axis, other embodiments may utilize any symmetric shape such as circles, rings, diamond shapes, crosses, and more complex structures. Additionally, the basic shape allows modulation of the scattering strength along the symmetry axis, for example by varying its size or form.

Away from the axis of symmetry, non-symmetric elements may be utilized, with the degree of asymmetry increasing with their distance from the axis. The most asymmetric points are thus at the top-left and bottom-right corner of the two-dimensional grating coupler 400, where large scattering strength is needed in only one direction. Such diffractive elements may, for instance, be created from narrow rectangular shapes.

Between the corners and the axis of symmetry, a shape transition may be employed that closely follows the design parameter for the scattering strength in the two directions independently. The design parameters for each diffractive element in the grating may be unique. The shape transition is carefully modelled and parameterized in order to minimize coupling loss.

As shown in the inset plots of FIG. 4, the scattering strength increases in both directions of optical travel, with the maximum being at the farthest distance from respective inputs, meaning the top right corner of grating coupler 400 has the highest scattering strength in the vertical and horizontal direction.

Exemplary design goals for two-dimensional mode matching grating couplers are that (i) scattering strengths be different in two directions and (ii) the scattering strength be modulated, indicates that diffractive elements of complex design that change their basic shape be utilized, depending on their position in the grating coupler 400.

A basic shape transition between symmetric and asymmetric diffractive elements is the transition between squares and lines, for example. To modulate the coupling strength, the size (area fill factor) of the scatterers would generally need to be changed. However, this would alter the propagation of the light in the grating coupler 400 and would require adjusting the position of the scatterers to maintain phase matching to the outgoing light.

Another option to adjust the scattering strength is to utilize a transition between shapes while maintaining a constant fill factor. For example, circles and rings of the same area are both symmetric but have different scattering strengths. Also, the polarization-dependent behavior of the grating can be addressed using this type of scatterers.

While FIG. 4 illustrates optical signals from within the chip via waveguides being scattered out of the chip using the grating coupler 400, the reverse process is also possible. In this case, optical signals may be received from a vertical direction from the top surface of the chip, and scattered in directions opposite to the Light Flow directions shown in FIG. 4, where the scattering strength decreases as the wave travels in this direction out of the grating coupler and into a waveguide in a direction essentially parallel to the top surface of the chip. The asymmetries in the grating coupler also provide efficient scattering into the waveguides coupled to the grating coupler 400.

Figure 5:
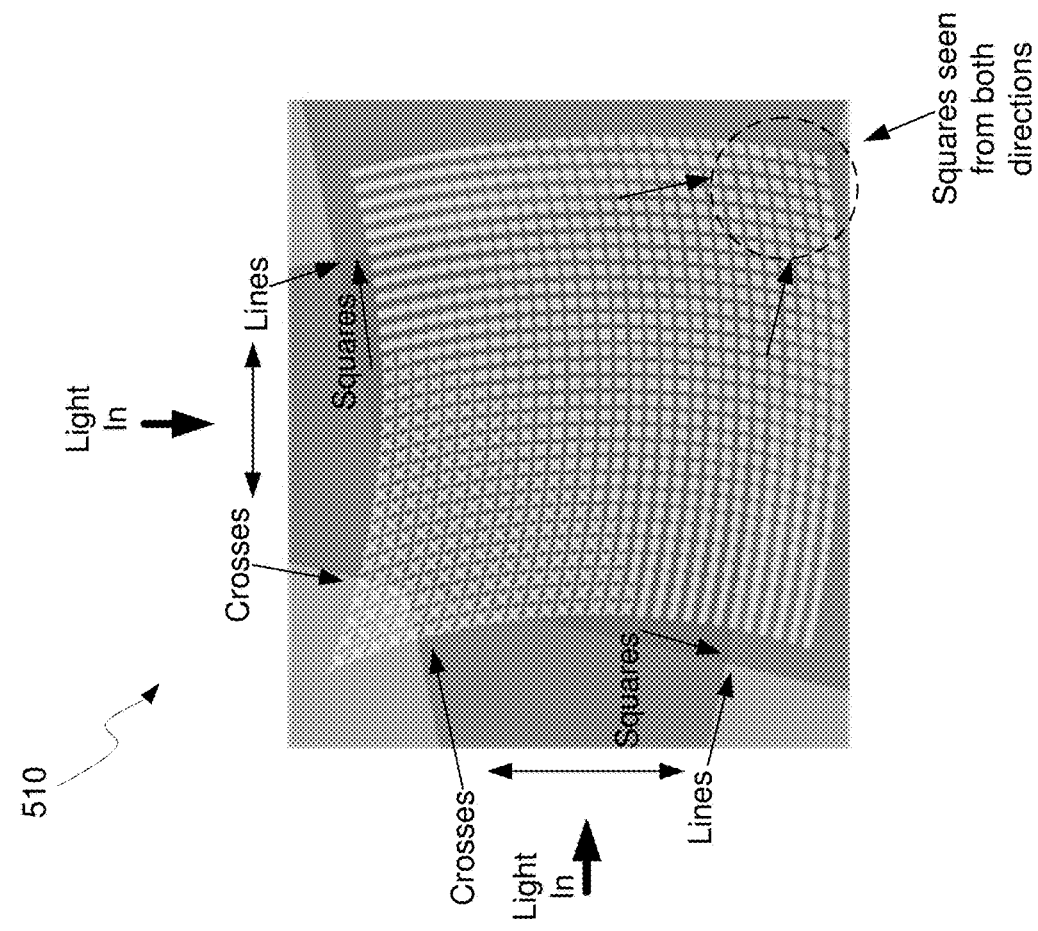
FIG. 5 shows examples of two-dimensional mode-matching grating couplers with shape transitions, in accordance with an embodiment of the disclosure.
Figure 5:
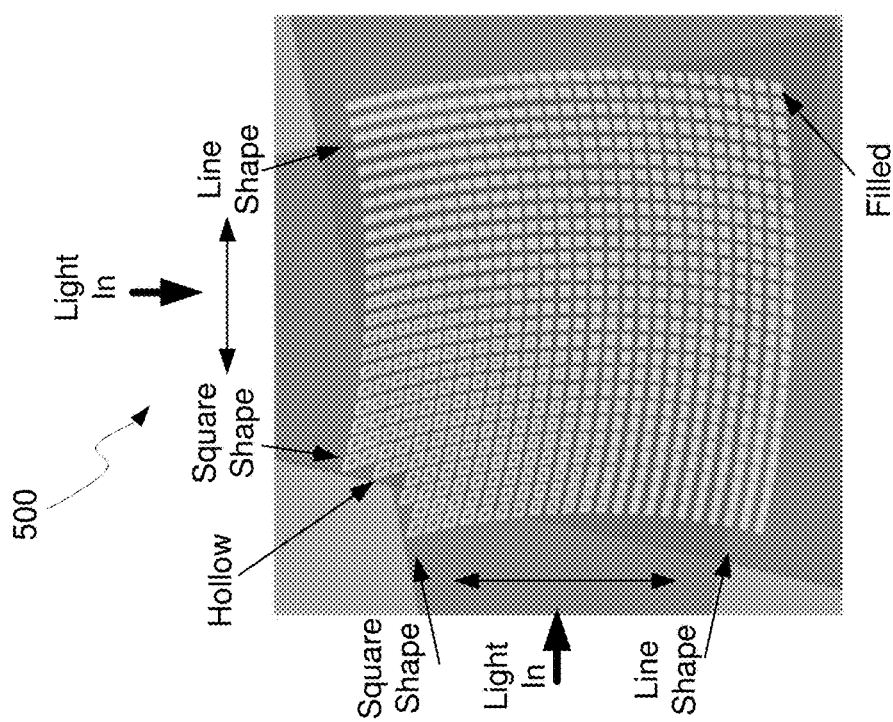

FIG. 5 shows examples of two-dimensional mode-matching grating couplers with shape transitions, in accordance with an embodiment of the disclosure. As shown in FIG. 5, there is shown two-dimensional grating couplers 500 and 510.

In grating coupler 500, square-to-line transitions are combined with hollow-to-filled rectangular shape transitions. While keeping the area fill factor constant, the size of the central hollow section reduces the scattering strength in this region, with hollow squares in the upper left section of grating coupler 500 and completely filled squares in the lower right section. The elongation of the element towards a line-like shape adjusts the symmetry. Therefore, the scattering strength increases in the grating coupler in the direction of travel of the received optical signals, with the maximum scattering strength in both directions in the lower right corner of grating coupler 500.

Another option is illustrated by grating coupler 510, where transitions between crosses and squares and between lines and squares may be employed to adjust scattering strength, and asymmetry, as well as the polarization characteristics of the grating. The minimal scattering strength is from the crosses and more linear structures in the direction of travel, with the maximum scattering strength in the lower right corner of grating coupler 510, with the more symmetric square scatterers. The arrows and associated text indicate the shape seen by light traveling in that direction.

While FIG. 5 illustrates optical signals from within the chip via waveguides being scattered out of the chip using the grating couplers 500 or 510, the reverse process is also possible. In this case, optical signals may be received from a vertical direction from the top surface of the chip, and scattered in directions opposite to the Light In directions shown in FIG. 5, where the scattering strength decreases as the wave travels in this direction out of the grating coupler into a waveguide in a direction essentially parallel to the top surface of the chip. The asymmetries in the grating coupler also provide efficient scattering into the waveguides coupled to the grating couplers 500 and 510.

Figure 6:
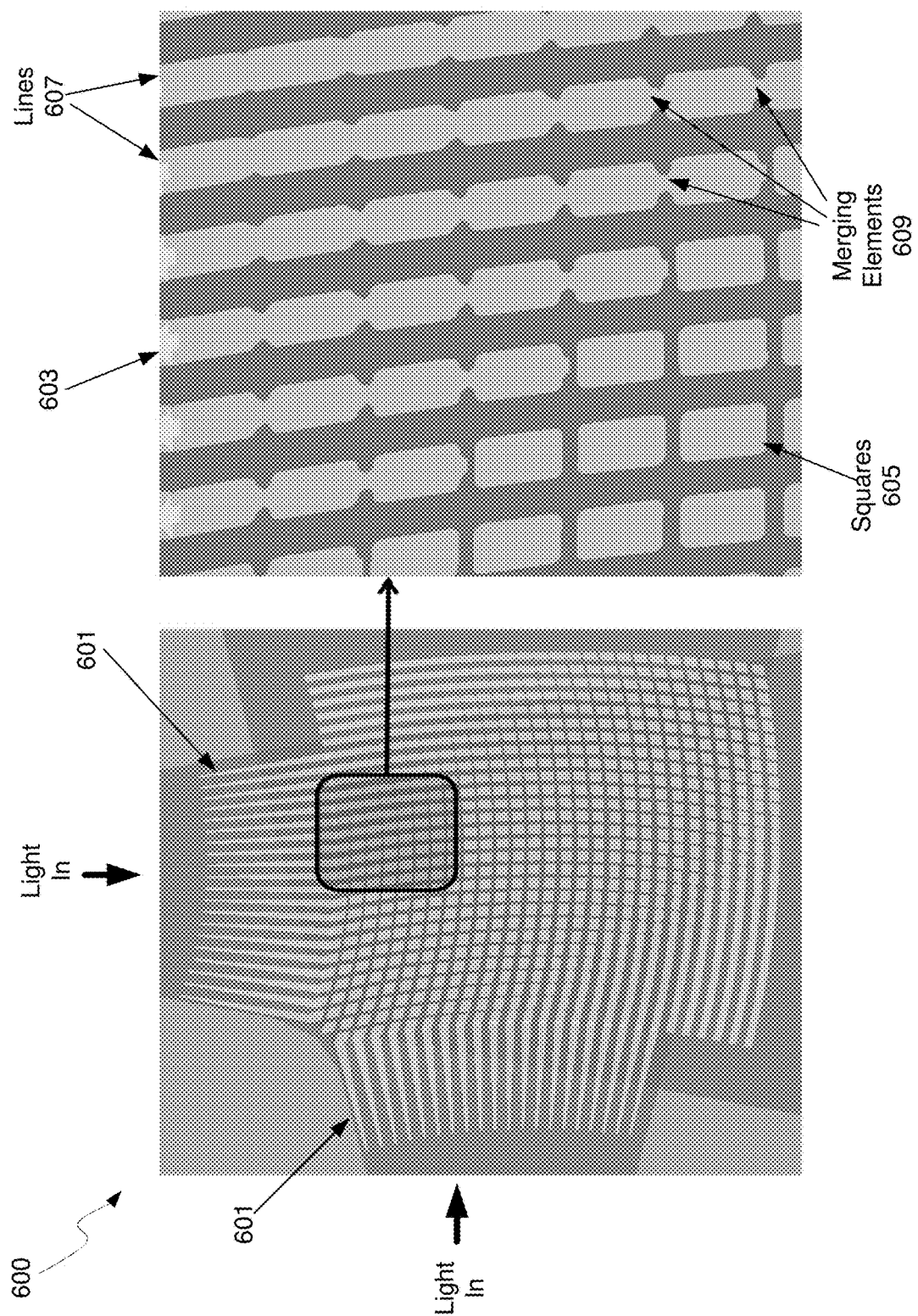
FIG. 6 shows an example of a two-dimensional mode-matching grating coupler with shape transitions that result in merging scatterers, in accordance with an embodiment of the disclosure.

FIG. 6 illustrates a grating coupler with shape transitions that result in merging scatterers for improved mode matching, in accordance with an example embodiment of the disclosure. Referring to FIG. 6, there is shown grating coupler 600 comprising mode converters 601 and gratings 603, with the inset on the right being a close-up view of the gratings 603. The mode converters 601 may comprise taper structures having a change of material in the top part of the waveguide, such as the removal of silicon material in a silicon waveguide, for example, to a configurable depth, with a configurable width and spacing. Mode converters are further disclosed in U.S. patent application Ser. No. 15/945,370, which is hereby incorporated by reference in its entirety.

Mode matching gratings allow the use of mode converters to replace the hard interface between grating area and waveguide with a gradual transition that the light can follow avoiding parasitic effects such as scattering or reflection. FIG. 6 shows a mode matching grating combined with elongated tapers, mode converters 601, in the propagation direction of the light as one possible example of such a mode converter.

Shape transitions are not necessarily restricted to one unit cell. They can also connect to neighboring unit cells to cater for a wider range coupling strength. Lines have the strongest possible scattering strength in one direction. By merging neighboring cells, the appearance becomes more line-like, which provides a wider range of scattering strengths. This can be of particular importance to manage restrictions in fabrication, such as the minimum allowed size of features for lithography and etching processes, while providing a wide range of scattering strengths to optimize mode matching.

As shown in the inset of FIG. 6, the square or rectangular structures 605 in the lower left corner gradually switch to lines 607 in the upper right corner with some of the squares merging with neighboring squares using the narrow merging elements 609 between the squares 605, although these structures are not limited to square or rectangular shapes, but could also be rounded or diamond-like, for example. The merging elements 609 may gradually increase in width until they are the width of the lines 607, thereby providing a smooth transition from one shape to another.

In an example embodiment of the disclosure, a method and system is described for two-dimensional mode-matching grating couplers and comprise, in a photonic chip comprising a grating coupler at a surface of the photonic chip, the grating coupler having increased scattering strength in a direction of a light wave traveling through the grating coupler: receiving an optical signal from a first direction within the photonic chip; and scattering the optical signal out of the surface of the photonic chip. A second optical signal may be received in the grating coupler from a second direction within the photonic chip.

The second optical signal may be scattered out of the surface of the photonic chip. The increasing scattering strength may be configured by increased width scatterers along a direction perpendicular to the direction of light travel. The increased scattering strength may be configured by a transition of shapes of scatterers in the grating coupler. The shape of the scatterers may transition from crosses to squares, from hollow to filled shapes, and/or from squares or other shapes to lines. The transition from squares to lines may include narrow merging elements between neighboring. The photonic chip may be a complementary metal oxide semiconductor (CMOS) chip.

In another example embodiment, a method and system is described for two-dimensional mode-matching grating couplers and may comprise, in a photonic chip comprising a grating coupler at a surface of the photonic chip, the grating coupler having increased scattering strength in first and second directions of light waves traveling through the grating coupler: receiving a first optical signal from the first direction within the photonic chip; receiving a second optical signal from the second direction within the photonic chip; and scattering the first and second optical signals out of the surface of the photonic chip.

In another example embodiment, a method and system is described for two-dimensional mode-matching grating couplers and may comprise, in a photonic chip comprising a grating coupler at a surface of the photonic chip, the grating coupler having decreased scattering strength in a direction of light waves traveling through the grating coupler: receiving an optical signal from the surface of the photonic chip via the grating coupler; and scattering the optical signal into a waveguide coupled to the grating coupler, the optical signal communicated in a direction parallel to the surface of the photonic chip.

While the present disclosure has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, the method comprising:
in a photonic chip comprising a grating coupler at a surface of the photonic chip, the grating coupler having increased scattering strength in a direction of a light wave traveling through the grating coupler, the increased scattering strength caused by a transition of shapes of scatterers in the grating coupler:
receiving an optical signal from a first direction within the photonic chip; and
scattering the optical signal out of the surface of the photonic chip.

2. The method according to claim 1, comprising receiving a second optical signal in the grating coupler from a second direction within the photonic chip.

3. The method according to claim 2, comprising scattering the second optical signal out of the surface of the photonic chip.

4. The method according to claim 1, wherein the increasing scattering strength is caused by increased width scatterers along a direction perpendicular to the direction of light travel.

5. The method according to claim 1, wherein the shape of some of the scatterers transitions from crosses to squares.

6. The method according to claim 1, wherein the shape of some of the scatterers transitions from hollow to filled shapes.

7. The method according to claim 1, wherein the photonic chip comprises a complementary metal oxide semiconductor (CMOS) chip.

8. A system for communication, the system comprising:
a photonic chip comprising a grating coupler at a surface of the photonic chip, the grating coupler having increased scattering strength in a direction of a light wave traveling through the grating coupler, the increased scattering strength caused by a transition of shapes of scatterers in the grating coupler, the photonic chip being operable to:
receive an optical signal from a first direction within the photonic chip; and
scatter the optical signal out of the surface of the photonic chip.

9. The system according to claim 8, wherein the photonic chip is operable to receive a second optical signal in the grating coupler from a second direction within the photonic chip.

10. The system according to claim 9, wherein the photonic chip is operable to scatter the second optical signal out of the surface of the photonic chip.

11. The system according to claim 8, wherein the increasing scattering strength is caused by increased width scatterers along a direction perpendicular to the direction of light travel.

12. The system according to claim 8, wherein the shape of the scatterers transitions from crosses to squares.

13. The system according to claim 8, wherein the shape of some of the scatterers transition from hollow to filled shapes.

14. A method for communication, the method comprising:
   in a photonic chip comprising a grating coupler at a surface of the photonic chip, the grating coupler having decreased scattering strength in a direction of light waves traveling through the grating coupler, the increased scattering strength caused by a transition of shapes of scatterers in the grating coupler:
      receiving an optical signal from the surface of the photonic chip via the grating coupler; and
      scattering the optical signal into a waveguide coupled to the grating coupler, the optical signal communicated in a direction parallel to the surface of the photonic chip.

* * * * *